(12) United States Patent
Akiyama et al.

(10) Patent No.: US 11,379,493 B2
(45) Date of Patent: Jul. 5, 2022

(54) FACTOR ANALYSIS APPARATUS, FACTOR ANALYSIS METHOD, AND NON-TRANSITORY STORAGE MEDIUM

(71) Applicant: KABUSHIKI KAISHA TOSHIBA, Tokyo (JP)

(72) Inventors: Sayaka Akiyama, Yokohama Kanagawa (JP); Kohei Maruchi, Tokyo (JP); Masatake Sakuma, Ichikawa Chiba (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 127 days.

(21) Appl. No.: 15/900,455

(22) Filed: Feb. 20, 2018

(65) Prior Publication Data

US 2019/0050460 A1    Feb. 14, 2019

(30) Foreign Application Priority Data

Aug. 10, 2017   (JP) .............................. JP2017-155966

(51) Int. Cl.
*G06F 16/00* (2019.01)
*G06F 16/2458* (2019.01)
*G06F 7/20* (2006.01)

(52) U.S. Cl.
CPC ............ *G06F 16/2474* (2019.01); *G06F 7/20* (2013.01)

(58) Field of Classification Search
CPC .................. G06F 16/2474; G06F 7/20
See application file for complete search history.

(56) References Cited

U.S. PATENT DOCUMENTS

| | | | |
|---|---|---|---|
| 9,122,273 B2 | 9/2015 | Uchiyama et al. | |
| 2008/0313151 A1* | 12/2008 | Furumoto | G06F 16/2458 |
| 2012/0310597 A1* | 12/2012 | Uchiyama | G05B 23/0221 |
| | | | 702/185 |

FOREIGN PATENT DOCUMENTS

| | | |
|---|---|---|
| JP | H11-250135 | 9/1999 |
| JP | 2003-216923 | 7/2003 |
| JP | 2011-150496 A | 8/2011 |
| WO | WO 2011-104760 | 9/2011 |

* cited by examiner

*Primary Examiner* — Neveen Abel Jalil
*Assistant Examiner* — Paul Kim
(74) *Attorney, Agent, or Firm* — Finnegan, Henderson, Farabow, Garrett & Dunner L.L.P.

(57) ABSTRACT

An apparatus as an aspect of the present invention is a factor analysis apparatus that analyzes a relationship between a target event that is a target of factor analysis and an assumed factor of the target event, and includes a similarity calculator, a first influence calculator, and a second influence calculator. The similarity calculator calculates a degree of similarity between a data item included in provided time-series data and the assumed factor. The first influence calculator calculates a first degree of influence indicating a degree of influence of the data item on the target event on the basis of time-series data of the data item and time-series data of the target event. The second influence calculator calculates a second degree of influence indicating a degree of influence of the assumed factor on the target event on the basis of the degree of similarity and the first degree of influence.

9 Claims, 11 Drawing Sheets

| TARGET EVENT (EFFECT) | SUB-FACTOR CANDIDATE | | | | | |
|---|---|---|---|---|---|---|
| AIR-CONDITIONING ABNORMALITY 0: NORMAL 1: ABNORMAL | BOARDING RATE [%] | OUTSIDE TEMPERATURE [°C] | VEHICLE SPEED [km/h] | AIR-CONDITIONING SET TEMPERATURE [°C] | COMPARTMENT TEMPERATURE [°C] | DOOR OPENING COMMAND VALUE 0: EXECUTED 1: NON-EXECUTED |
| 0 | 30 | 21.7 | 40 | 20.0 | 18.9 | 0 |
| 0 | 32 | 22.0 | 42 | 25.0 | 19.0 | 0 |
| 1 | 31 | 21.8 | 43 | 25.0 | 19.2 | 0 |
| 0 | 34 | 21.6 | 50 | 25.0 | 19.5 | 0 |

FIG. 4

| | SUB-FACTOR CANDIDATE | | | | | |
|---|---|---|---|---|---|---|
| | BOARDING RATE [%] | OUTSIDE TEMPERATURE [°C] | VEHICLE SPEED [km/h] | AIR-CONDITIONING SET TEMPERATURE [°C] | COMPARTMENT TEMPERATURE [°C] | DOOR OPENING COMMAND |
| OPERATION | 0.95 | 0.00 | 0.05 | 0.50 | 0.00 | 0.70 |
| EQUIPMENT | 0.00 | 0.00 | 0.00 | 0.82 | 0.59 | 0.78 |
| CLIMATE | 0.00 | 0.99 | 0.00 | 0.68 | 0.57 | 0.00 |
| VEHICLE SURROUNDINGS | 0.87 | 0.00 | 0.96 | 0.00 | 0.79 | 0.89 |

ASSUMED FACTOR

FIG. 5

FACTOR ANALYSIS APPARATUS, FACTOR ANALYSIS METHOD, AND NON-TRANSITORY STORAGE MEDIUM

CROSS-REFERENCE TO RELATED APPLICATION (S)

This application is based upon and claims the benefit of priority from Japanese Patent Application No. 2017-155966, filed Aug. 10, 2017; the entire contents of which are incorporated herein by reference.

FIELD

Embodiments described herein relate generally to a factor analysis apparatus, a factor analysis method, and a non-transitory storage medium.

BACKGROUND

Data on a state of a monitoring target which is created for detection of an abnormality in the monitoring target includes data on a factor of an abnormality occurring in the monitoring target. In recent years, an abnormality which possibly occurs in the future is more generally derived in advance based on extraction and analysis of a factor from such data on a state of a monitoring target.

To extract a factor, a relationship between a factor and an abnormality has to be made clear in advance. However, for example, in the case where a singularity such as an outlier is not found in data on a state of a monitoring target, or in the case where there are not many abnormalities in the monitoring target, association of an abnormality and a factor is difficult.

BRIEF DESCRIPTION OF THE DRAWINGS

FIG. 4 is a diagram illustrating an example of analysis data;

FIG. 5 is a diagram illustrating an example of degrees of similarity;

DETAILED DESCRIPTION

According to an embodiment of the present invention, even if a singularity is not included in data which is used for factor analysis, an event which is a target of factor analysis and an assumed factor of the event are associated with each other.

A factor analysis apparatus as an aspect of the present invention is a factor analysis apparatus that analyzes a relationship between a target event that is a target of factor analysis and an assumed factor that is assumed to be a factor of the target event, and includes a similarity calculator, a first influence calculator, and a second influence calculator. The similarity calculator calculates a degree of similarity between a data item included in provided time-series data and the assumed factor. The first influence calculator calculates a first degree of influence indicating a degree of influence of the data item on the target event on the basis of time-series data of the data item and time-series data of the target event. The second influence calculator calculates a second degree of influence indicating a degree of influence of the assumed factor on the target event on the basis of the degree of similarity and the first degree of influence.

Below, a description is given of embodiments of the present invention with reference to the drawings. The present invention is not limited to the embodiments.

First Embodiment

Figure 1:
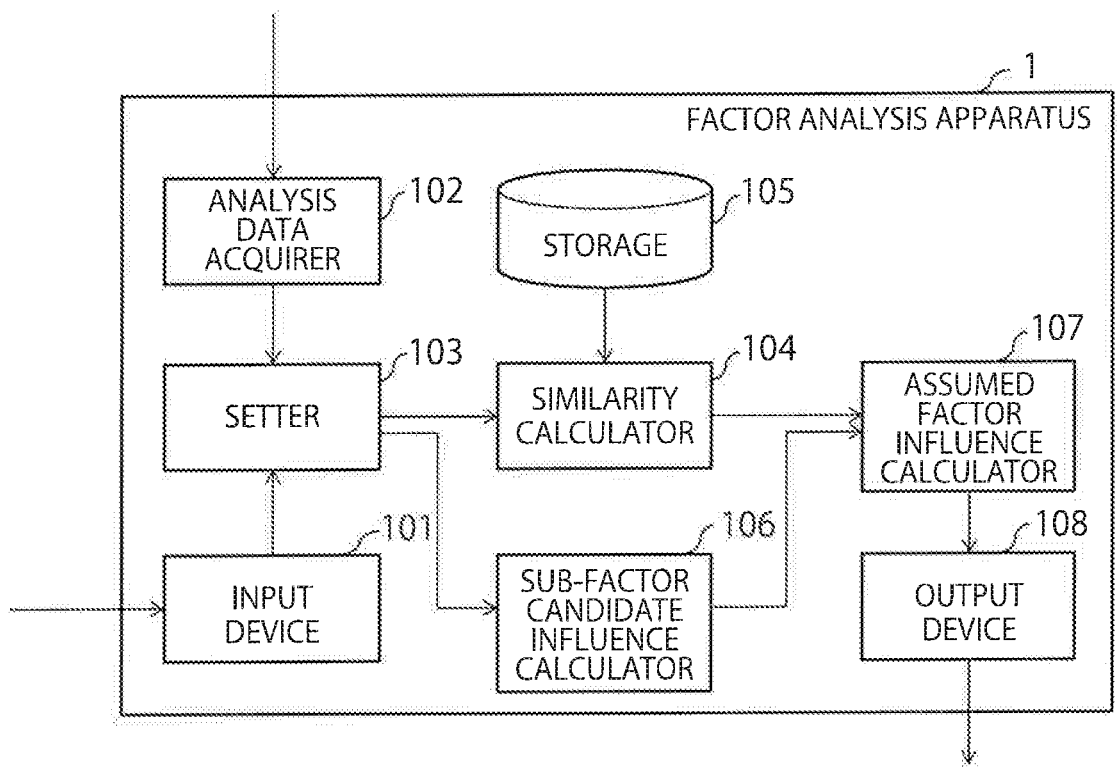
FIG. 1 is a block diagram illustrating an example of a factor analysis apparatus according to a first embodiment.

FIG. 1 is a block diagram illustrating an example of a factor analysis apparatus according to a first embodiment. In the first embodiment, the factor analysis apparatus 1 includes an input device 101, an analysis data acquirer 102, a setter 103, a similarity calculator 104, a storage 105, a sub-factor candidate influence (first influence) calculator 106, an assumed factor influence (second influence) calculator 107, and an output device 108.

On the basis of provided analysis data, the factor analysis apparatus 1 associate an event which is a target of factor analysis and a factor, of the event, that can be assumed. An event which is a target of factor analysis will be referred to as a target event. Also, a factor, of a target event, that can be assumed will be referred to as an assumed factor.

The factor analysis apparatus 1 of the present embodiment calculates an extent of influence of the assumed factor on the target event. This extent will be referred to as the degree of influence.

For example, in the case of analyzing an abnormality in a certain appliance, the degree of influence on the abnormality is calculated for each of a plurality of assumed factors. An assumed factor with a higher degree of influence is considered to be more related to occurrence of the abnormality. Hence, occurrence of the abnormality may be prevented by taking a measure against an assumed factor with a high degree of influence.

A target event is not particularly limited, and it may be an event related to a state of an appliance without being limited to an abnormality in the appliance. The target event may be an event occurring in a system configured from a plurality of appliances, without being limited to an appliance. Alternatively, the target event may be an event occurring in a living body such as a human or an animal.

An assumed factor is determined in advance in accordance with a target event. Alternatively, a plurality of assumed factors may be stored in advance, and an assumed factor to be used may be selected on the basis of the target event.

The factor analysis apparatus 1 associates a target event and an assumed factor on the basis of the concept of a factor and effect diagram. A factor and effect diagram is a diagram which systematically illustrates a relationship between an "effect" and a "factor". According to the concept of the factor and effect diagram, an event such as a result is taken as an effect, and a concept which is considered to influence the effect is taken as a factor. The factor and effect diagram is illustrated in the shape of a fishbone, and is thus referred to also as a fishbone chart.

Figure 2:
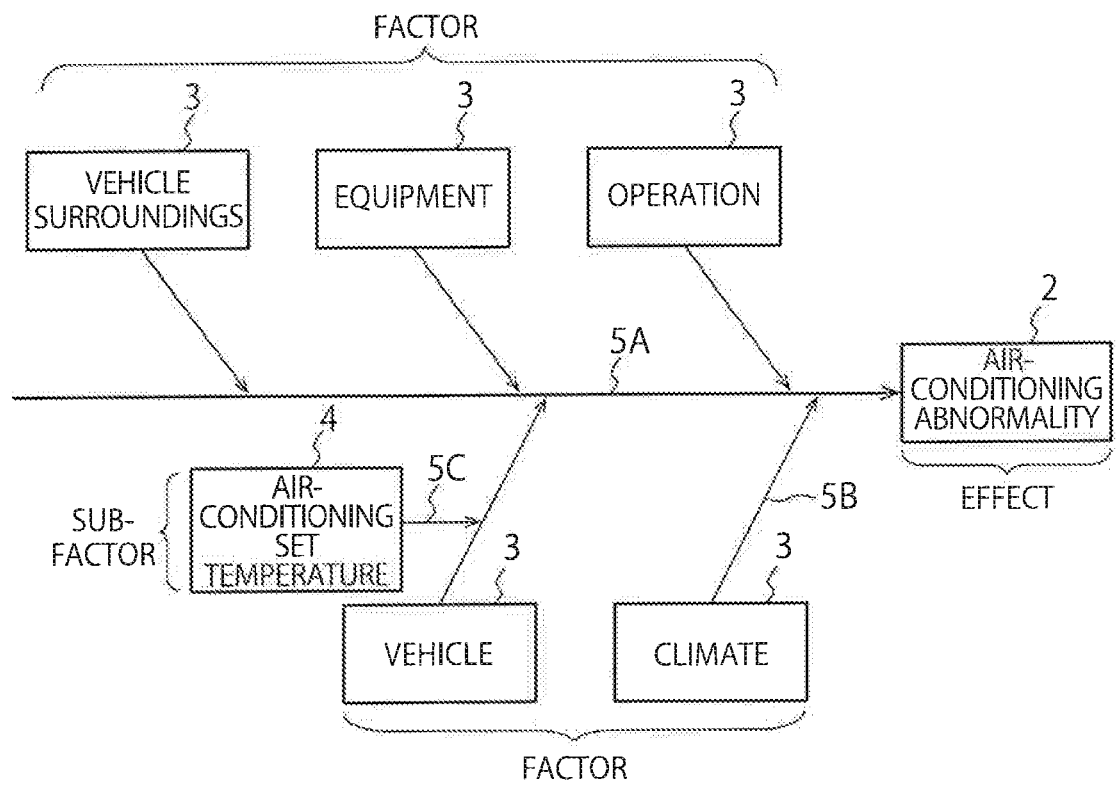
FIG. 2 is a diagram illustrating a first example of a factor and effect diagram.

FIG. 2 is a diagram illustrating a first example of the factor and effect diagram. The factor and effect diagram includes an effect 2, a factor 3, a sub-factor 4, and an arrow (bone) 5. The example of the factor and effect diagram in FIG. 2 assumes a case of analyzing a factor of an abnormality in air-conditioning of a vehicle. In FIG. 2, an air-conditioning abnormality is illustrated as the effect 2. Vehicle surroundings, equipment, operation, vehicle, and climate are illustrated as the factors 3.

The sub-factor 4 is a more specific concept of the factor 3. That is, the factor 3 is a more abstract concept of the sub-factor 4, and the sub-factor 4 gives details of the factor 3. Depending on the degree of specificity, narrower concepts of the factor 3 are referred to also as child factors, grandchild factors and the like, but in the present embodiment, the narrower concepts of the factor 3 are collectively referred to as the sub-factors 4. In FIG. 2, an "air-conditioning set temperature" of a vehicle is illustrated as the sub-factor 4 of a "vehicle" as the factor 3.

The arrow 5 indicates a relationship between events. The effect 2 is not directly connected to the factors 3, but is connected to the factors 3 by a backbone (big bone) 5A connected to the effect 2 and middle-sized bones 5B connecting the backbone 5A and the factors 3. The sub-factor 4 is connected to the middle-sized bone 5B for the corresponding factor 3 by a small bone SC.

The factor analysis apparatus 1 of the present embodiment takes the target event as the effect 2 in the factor and effect diagram, and the assumed factor as the factor 3 in the factor and effect diagram. Furthermore, the factor analysis apparatus 1 takes each data item in provided analysis data as a candidate for the sub-factor 4 (sub-factor candidate), and calculates, for each factor 3, the degree of possibility of each data item being the sub-factor 4. A data item is not simply taken as the sub-factor 4, because a data item is not necessarily associated with one factor 3.

The degree of influence of the factor 3 on the effect 2 is considered to be the collective degree of influence of subordinate sub-factors 4 of the factor 3 on the effect 2. Hence, the factor analysis apparatus 1 calculates the degree of possibility that a sub-factor candidate is a subordinate of the factor 3 and the degree of influence of this sub-factor candidate on the effect 2. Then, the factor analysis apparatus 1 calculates the degree of influence of the factor 3 on the effect 2. Details will be given together with a description of an internal configuration of the factor analysis apparatus 1.

Figure 3:
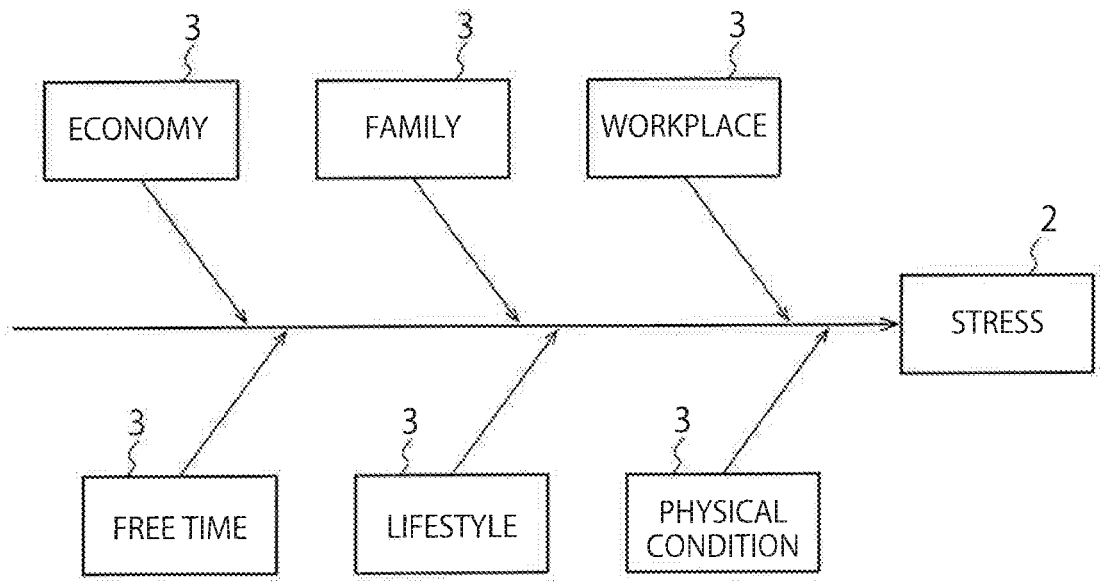
FIG. 3 is a diagram illustrating a second example of the factor and effect diagram.

FIG. 3 is a diagram illustrating a second example of the factor and effect diagram. In the example in FIG. 3, stress on a person is illustrated as the effect 2. Economy, family, workplace, physical condition, lifestyle, and free time, which are considered to be main causes of stress, are illustrated as the factors 3. As described above, the effect 2 (that is, the target event) may be an event related to a living body, instead of an event related to an appliance. The factor 3 (that is, the assumed factor) may be freely determined in accordance with the target event.

An internal configuration of the factor analysis apparatus 1 will be described. The input device 101 receives designation of a target event and an assumed factor from a user or the like. Incidentally, a target event may be designated based on analysis data, instead of being received by the input device 101. An assumed factor may be extracted from the storage 105 on the basis of target event.

The input device 101 may receive correction of a parameter to be used in a process. In the case where the name of a data item included in the analysis data is not a name appropriately indicating data contents, for example, a corrected name of the data item may be received by the input device 101.

The analysis data acquirer 102 acquires analysis data. The analysis data includes time-series data of a target event, and time-series data of a data item other than the target event.

FIG. 4 is a diagram illustrating an example of the analysis data. Names of data items are described in a first row of a table illustrated in FIG. 4. In the example in FIG. 4, the target event is an abnormality in air-conditioning of a rail vehicle or the like. A first column is time-series data indicating the target event, and an abnormality in the air-conditioning is indicated by a numerical value. Incidentally, a numerical value "0" indicates "normal", and a numerical value "1" indicates "abnormal".

Data items other than the target event, and the number of such data items, are not particularly limited. For example, in the example in FIG. 4, pieces of time-series data of measurement values measured by a sensor in the vehicle (boarding rate, outside temperature, composition speed, air-conditioning set temperature, compartment temperature, door opening command value) are indicated in second and following columns. Data of an item which is considered to be not directly relevant to the target event may also be included in the analysis data.

Incidentally, in the example in FIG. 4, pieces of time-series data of the target event and other data items are collectively displayed in one table, but the analysis data may be divided into respective data items. In contrast, the analysis data acquirer 102 may process a plurality of pieces of data to create one piece of analysis data as illustrated in FIG. 4. For example, a plurality of pieces of measurement data are directly or indirectly acquired from respective sensors. Then, one piece of analysis data as illustrated in FIG. 4 may be created from the plurality of pieces of measurement data.

The analysis data acquirer 102 may create time-series data of the target event from a plurality of pieces of measurement data. That is, determination of a state such as an abnormality may be performed by the analysis data acquirer 102.

The analysis data acquirer 102 may perform a process such as standardization on acquired data. For example, if acquired data is partially missing, the analysis data acquirer 102 may estimate and complement a missing value on the basis of preceding and following values. Alternatively, the analysis data acquirer 102 may detects an outlier on the basis of preceding and following values and may smooth it. The analysis data acquirer 102 may also perform a process for reducing noise.

The setter 103 extracts a designated target event from the data items included in the analysis data from the analysis data acquirer 102. Then, a sub-factor candidate is selected from the rest of the data items. Incidentally, one or some of the rest of the data items may be made the sub-factor candidate(s). Alternatively, all of the rest of the data items may be made the sub-factor candidates without making selections because which data items have causal relationship with the target event is not known.

The setter 103 may change the name of a sub-factor candidate. For example, the setter 103 may change the name of a sub-factor candidate to a corrected name received by the input device 101.

The setter 103 may select an assumed factor for the target event from the assumed factors stored in the storage 105 on the basis of a target event.

The similarity calculator 104 calculates a feature of the name of a sub-factor candidate, and a feature of the name of an assumed factor. Then, The similarity calculator 104 calculates the degree of similarity between the names on the basis of the feature of the name of the sub-factor candidate and the feature of the name of the assumed factor. In this manner, a data item included in the analysis data and an assumed factor are associated by text processing.

A known term feature extraction method may be used for calculation of the features and the degree of similarity. For example, methods such as continuous bag-of-words (CBoW), skip-gram, term frequency-inverse document frequency (TF-IDF), strength of association (SOA), and pointwise mutual information (PMI) are conceivable. Other methods may also be used.

For example, the name of the sub-factor candidate and the name of the assumed factor are represented by vectors by CBoW or the like. Hence, in the case where CBoW is used as the term feature extraction method, the similarity calculator 104 may take a vector as the feature. Then, the similarity calculator 104 calculates the degree of similarity on the basis of both vectors. Although there are various types of the degree of similarity and various calculation methods on the methods, a type of the degree of similarity and a calculation method may be freely selected as appropriate. For example, the degree of similarity may be calculated taking into consideration the position of a start point of a vector or the inclination of the vector.

A model for calculating the feature of a term is assumed to be stored in the storage 105 in advance. This model is assumed to be generated by prior learning. Incidentally, learning may be performed by the factor analysis apparatus 1.

Furthermore, a first group (first term group) including a plurality of terms which are similar to the name of a sub-factor candidate, and a second group (second term group) including a plurality of terms which are similar to the name of an assumed factor may be created, and the first group and the second group may be compared against each other to calculate the degree of similarity between the sub-factor candidate and the assumed factor. According to this method, the accuracy of the calculated degree of similarity is increased than in a case of simply comparing terms.

Terms which are similar to the name of the sub-factor candidate or the assumed factor may also be stored in the storage 105. In the case where the storage 105 is realized as a database, the similarity calculator 104 may extract a term belonging to the first or second group by using the function of the database and with the name of the sub-factor candidate or the assumed factor as an extraction key.

FIG. 5 is a diagram illustrating an example of the degrees of similarity. As illustrated in FIG. 5, the degree of similarity is calculated for each combination of an assumed factor and the sub-factor candidate. In the example in FIG. 5, the degree of similarity is expressed in a range between "0" and "1", and the closer the degree of similarity is to "1", the closer the meanings of the names, the usages, or the like are indicated to be. Furthermore, the closer the degree of similarity is to "1", the higher the degree of possibility of the sub-factor candidate being the sub-factor of the assumed factor.

The storage 105 stores data to be used in each process of the factor analysis apparatus 1. For example, the above-described model for calculating the feature of a term, a learnt term, and the like are stored. Incidentally, in FIG. 1, the storage 105 is connected to the similarity calculator 104, but the storage 105 may alternatively perform exchange of data with another component. Furthermore, data to be stored is not particularly limited, and data input to the factor analysis apparatus 1, data calculated in each process of the factor analysis apparatus 1, and the like may also be stored. Incidentally, a separate storage 105 may be provided for each type of data to be stored.

The sub-factor candidate influence calculator 106 calculates, for each sub-factor candidate, the degree of influence of the sub-factor candidate on the target event (first degree of influence). A known causal model may be used for calculation of the degree of influence on the target event. For example, it is conceivable to calculate the degree of influence by using Granger causality test, Rubin causal model, a linear non-Gaussian acyclic model (LiNGAM), convergent cross mapping (CCM) or the like. Other models may also be used.

The degree of influence may be a test value calculated by a causal model, a significant probability (p value) or the like, or may be calculated by a predetermined calculation formula from these values.

The assumed factor influence calculator 107 calculates, for each assumed factor, the degree of influence of the assumed factor on the target event. The degree of influence of an assumed factor on the target event is calculated based on the degree of similarity between each sub-factor candidate and the assumed factor, and the degree of influence of each sub-factor candidate on the target event.

For example, it is assumed that there are K (K is an integer of one or more) sub-factor candidates. The degree of influence of a k-th (k is an integer of one or more and K or less) sub-factor candidate on the target event will be indicated by "$\alpha_k$". The degree of similarity between the k-th sub-factor candidate and an i-th (i is an integer of one or more) assumed factor will be indicated by "$\beta_{ik}$". In this case, a degree of influence "$\gamma_i$" of the i-th assumed factor on the target event is expressed by the following equation.

[Expression 1]

$$\gamma_i = \sum_{k=1}^{K} \alpha_k \times \beta_{ik} \qquad (1)$$

The degree of influence of each assumed factor on the target event may be calculated by using such a calculation formula. Incidentally, other calculation formulae may also be used. The degree of influence may be adjusted such that the sum of the degrees of influence of factors becomes one.

The output device 108 may output data used in a process of each component of the factor analysis apparatus 1 and a processing result of each of the components. For example, a target event, an assumed factor, a sub-factor candidate, the degree of similarity, the degree of influence of the sub-factor candidate on the target event, the degree of influence of the assumed factor on the target event, and the like are output from the output device 108. Incidentally, data to be output from the output device 108 is not particularly limited. In FIG. 1, the output device 108 is connected to the assumed factor influence calculator 107, but the output device 108 may alternatively perform exchange of data with another component. For example, data stored in the storage 105 may be output.

The output method of the output device 108 is not particularly limited. An image, a sound or the like may be output to a display or the like which is connected to the factor analysis apparatus 1, or may be transmitted to an external communication terminal over a network. For example, an output result may be fed back to a communication terminal or the like which transmitted analysis data. Moreover, an electronic file recording a processing result may be generated, and saved in an external storage or the like.

Figure 6:
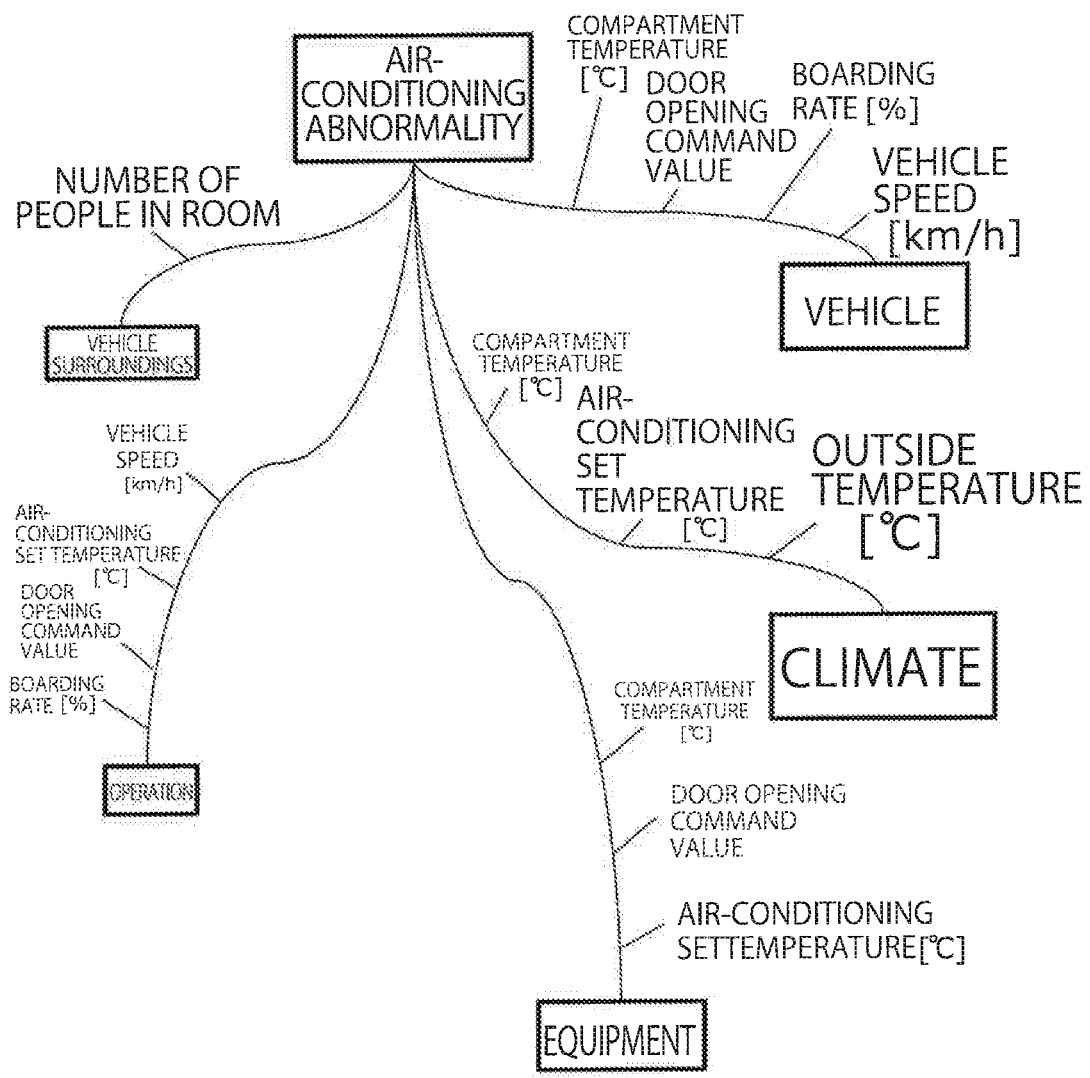
FIG. 6 is a diagram illustrating a first example of an output.

FIG. 6 is a diagram illustrating a first example of an output. In the example in FIG. 6, a target event, assumed factors, and sub-factor candidates are illustrated in the form of a factor and effect diagram. A sub-factor candidate belongs to an assumed factor with which the degree of similarity is not "0", and thus, some sub-factor candidates are displayed subordinate to a plurality of assumed factors.

In the example in FIG. 6, an assumed factor with great influence on the target event, and a sub-factor candidate subordinate to the assumed factor are displayed with large letters. It can therefore be understood in the example in FIG. 6 that the degree of influence of "climate" on "air-conditioning abnormality" is great, and that the degree of influence of "operation" on "air-conditioning abnormality" is small. Moreover, a sub-factor candidate subordinate to an assumed factor is displayed with larger letters, the higher the degree of similarity to the belonging assumed factor. Therefore, in the example in FIG. 6, it can be seen that "outside temperature" has a higher degree of similarity to "climate" compared with "compartment temperature".

In this manner, the property of an image may be changed according to processing results such as the degree of influence and the degree of similarity, such that which assumed factor greatly influences the target event may be easily visually grasped, for example. The shape, the pattern, the color, the position, the size, the range or the like of letters may be changed, for example.

Figure 7:
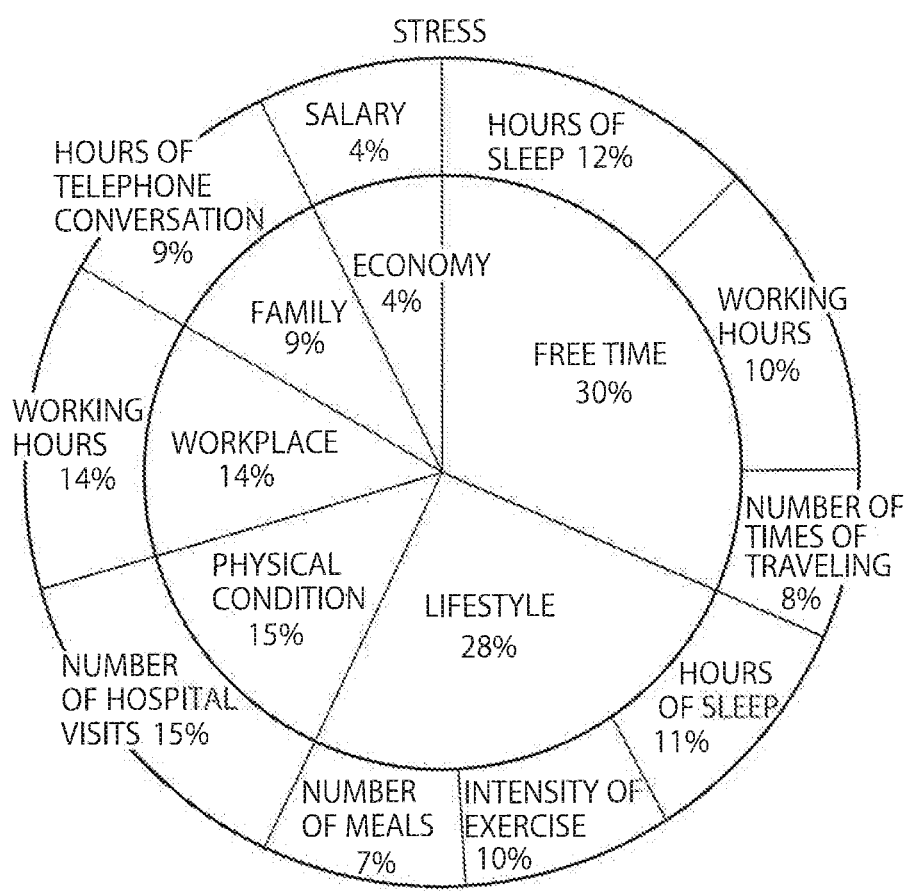
FIG. 7 is a diagram illustrating a second example of an output.

FIG. 7 is a diagram illustrating a second example of an output. Assumed factors are displayed in a pie chart on the inside, and sub-factor candidates are displayed in a pie chart on the outside. A displayed numerical value indicates the proportion of the degree of influence of an assumed factor or a sub-factor candidate on the target event to the degree of influence of all the assumed factors or all the sub-factor candidates on the target event. Comparison among the assumed factors or the sub-factor candidates may be performed in this manner based on the proportions of the degree of influence.

Incidentally, the output device 108 may switch to an output format as illustrated in FIG. 6 or FIG. 7, when an instruction regarding the output method is received from a user or the like via the input device 101. Moreover, detailed information may be further displayed.

Figure 8:
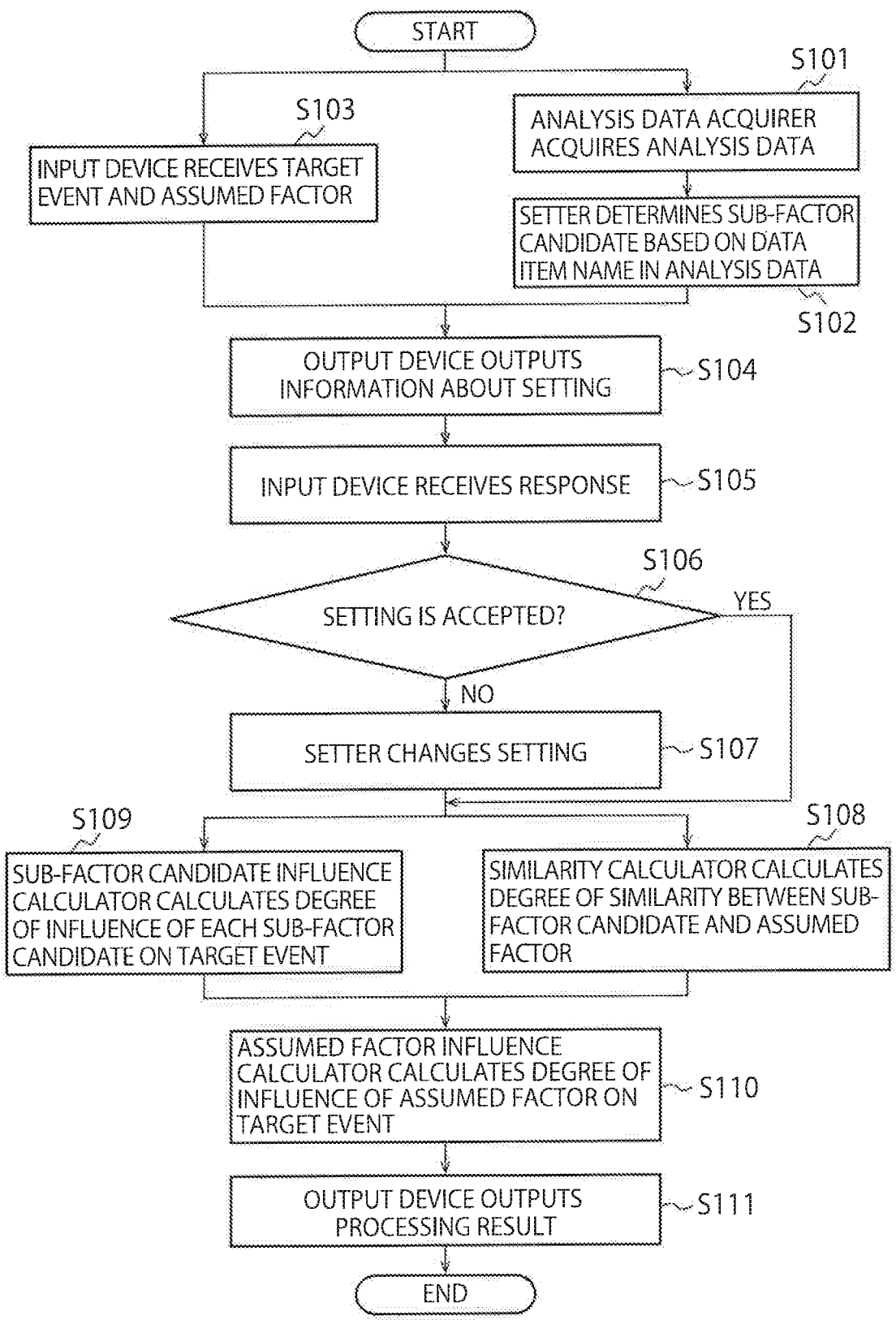
FIG. 8 is a diagram illustrating an example of a schematic flowchart of entire processing according to the first embodiment.

Next, a flow of processing of the factor analysis apparatus 1 will be described. FIG. 8 is a diagram illustrating an example of a schematic flowchart of entire processing according to the first embodiment.

The analysis data acquirer 102 acquires analysis data (S101). At this time, the analysis data acquirer 102 may process the analysis data. The analysis data is sent to the setter 103, and the setter 103 determines a sub-factor candidate on the basis of a data item name in the analysis data (S102). On the other hand, the input device 101 receives a target event and an assumed factor from the user or the like (S103). Then, the output device 108 outputs information about setting, such as a sub-factor candidate set by the setter 103, input target event and assumed factor, and the like (S104).

A response to the output information about setting is received by the input device 101 (S105). For example, the user who has checked the information about setting may accept or reject the setting. In the case where the setting is not accepted (S106: NO), the setter 103 changes the setting (S107). For example, it is conceivable to change the name of a sub-factor candidate to a name which is received by the input device 101. In the case where the setting is accepted (S106: YES), the processes in S108 and S109 are performed, without changing the setting.

After the setting is established, the similarity calculator 104 calculates the degree of similarity between a sub-factor candidate and an assumed factor (S108), and the sub-factor candidate influence calculator 106 calculates the degree of influence of each sub-factor candidate on the target event (S109). Then, the assumed factor influence calculator 107 calculates, for each assumed factor, the degree of influence of the assumed factor on the target event, on the basis of the degree of similarity calculated by the similarity calculator 104 and the degree of influence calculated by the sub-factor candidate influence calculator 106 (S110). Lastly, the output device 108 outputs the processing results, such as the degree of similarity, the degree of influence of the sub-factor candidate on the target event, and the degree of influence of the assumed factor on the target event (Sill).

Incidentally, this flowchart is only an example, and the order of processes and the like are not limited thereto as long as a necessary processing result can be obtained. For example, in the case where the target event and the assumed factor are determined in advance, the process in S103 may be skipped. The processing result of each process may be stored in the storage 105 in a sequential manner, and each component may acquire a processing result by referring to the storage 105.

As described above, according to the present embodiment, a data item in analysis data and an assumed factor of a target event are associated with each other by text processing. Then, the degree of influence of the assumed factor on the target event is calculated based on the degree of influence of the data item, which is associated with the assumed factor, on the target event. Accordingly, even in a case where a singularity, such as an abnormality, is not included in provided data, an assumed factor and a sub-factor candidate may be associated with a target event.

Second Embodiment

Figure 9:
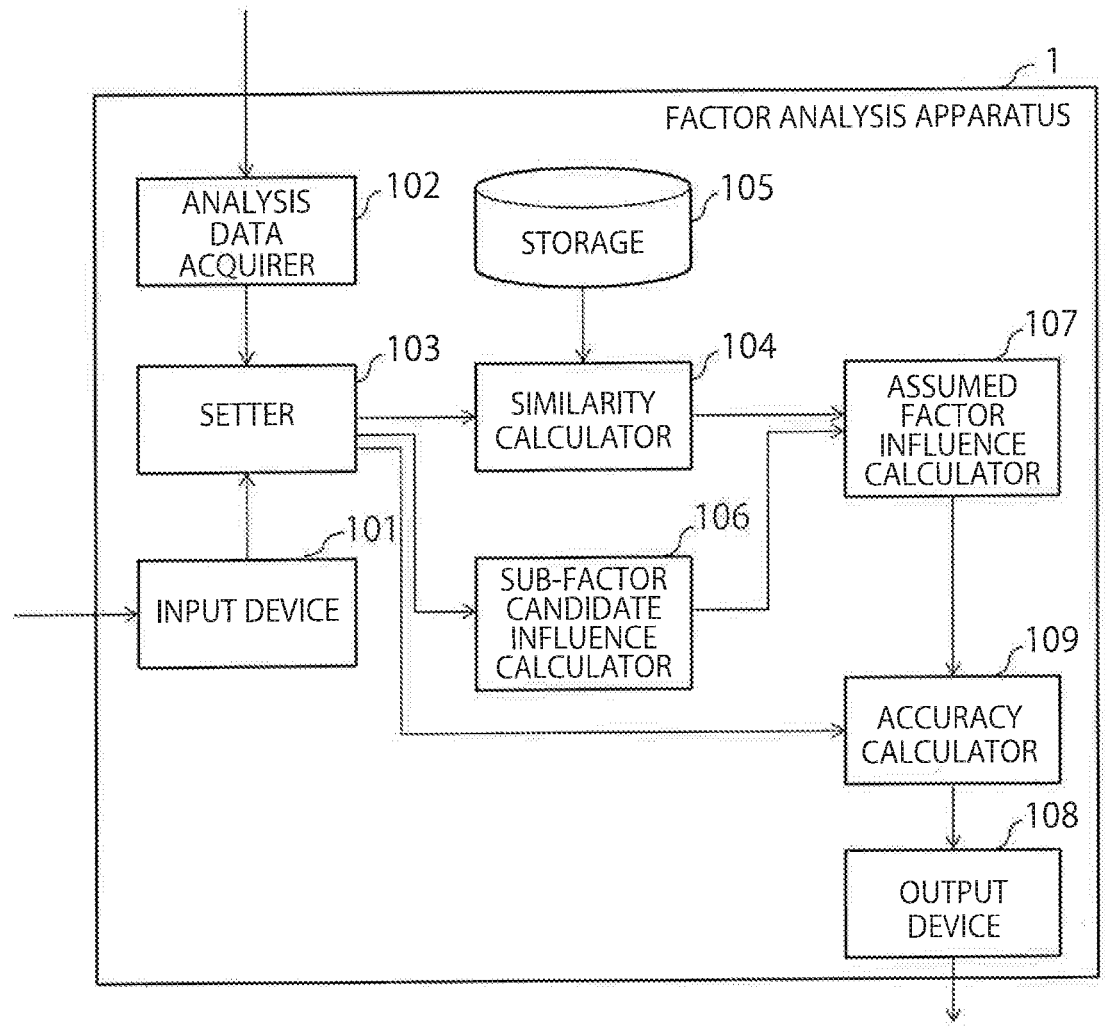
FIG. 9 is a block diagram illustrating an example of a factor analysis apparatus according to a second embodiment.

FIG. 9 is a block diagram illustrating an example of a factor analysis apparatus according to a second embodiment. The second embodiment is different from the first embodiment in that an accuracy calculator 109 is further included. A description of aspects the same as those in the first embodiment is omitted.

In the present embodiment, the accuracy of factor analysis is calculated. Furthermore, a calculation method used in processing and the like are switched based on the calculated accuracy. A highly accurate processing result may thereby be stably calculated.

Figure 10:
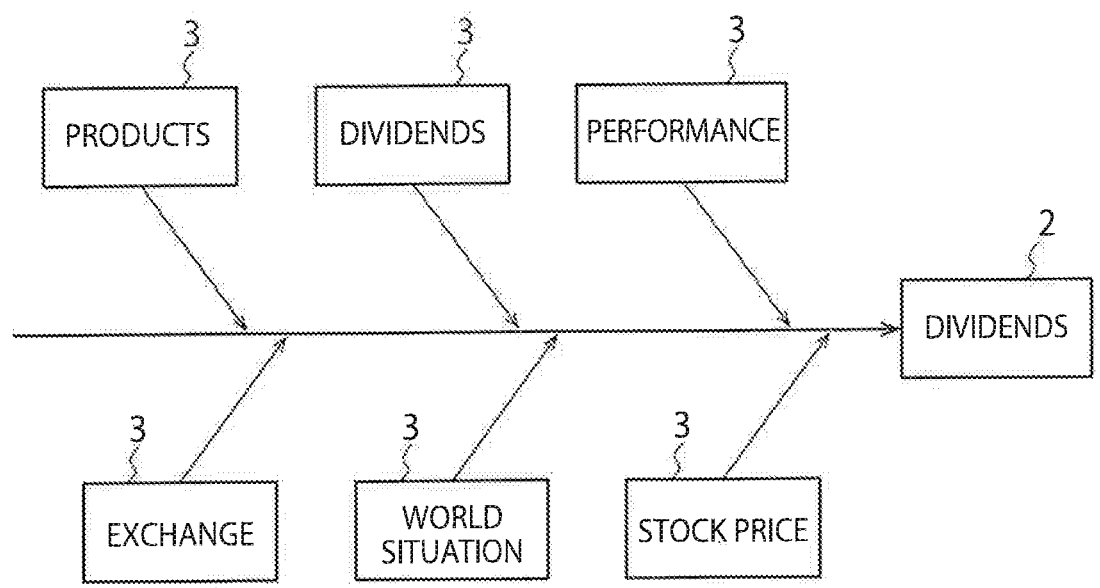
FIG. 10 is a diagram illustrating a third example of the factor and effect diagram.

FIG. 10 is a diagram illustrating a third example of the factor and effect diagram. In FIG. 10, fluctuations in a stock price of a company are assumed to be the effect 2, that is, the target event. As the factors 3, that is, the assumed factors, performance, dividends, and products of the company are selected. Domestic economy, world situation, and exchange are also selected.

Incidentally, if the degrees of influence of these assumed factors on the fluctuations in the stock price can be calculated, fluctuations in the stock price may be predicted by predicting the future fluctuations in each assumed factor.

The accuracy calculator 109 creates time-series data of an assumed factor from the analysis data of a sub-factor candidate, on the basis of the degree of similarity between the sub-factor candidate and the assumed factor. For example, the time-series data of the sub-factor candidate is multiplied by the degree of similarity, and the sum of such results may be taken as the time-series data of the assumed factor.

Furthermore, the accuracy calculator 109 calculates the time-series data of the target event from the time-series data of the assumed factor, on the basis of the degree of influence of the assumed factor on the target event. For example, the time-series data of each assumed factor is multiplied by the corresponding degree of influence, and the sum of such results may be taken as the time-series data of the target event.

Incidentally, the calculated time-series data will be referred to as estimated time-series data so as to be distinguished from the time-series data included in the analysis data.

Then, the accuracy calculator 109 calculates a correlation value between the estimated time-series data of the target event and actual time-series data of the target event included in the analysis data. The calculation method of the correlation value may be freely set as appropriate. For example, methods such as Pearson's product-moment correlation coefficient, Spearman's rank correlation coefficient, Kendall's rank correlation coefficient, distribution distance, and line-to-line distance are conceivable. Other methods may also be used.

The accuracy is determined based on the calculated correlation value. The correlation value itself may be given as the accuracy, or the correlation value may be processed. The accuracy calculator 109 determines whether the calculated accuracy satisfies a condition or not. The condition may be freely set as appropriate. For example, that the accuracy is within a predetermined allowable range, or is at a predetermined threshold or more may be taken as the condition. The condition and the value of the condition may be determined in advance, or may be received from the user or the like via the input device 101.

Figure 11:
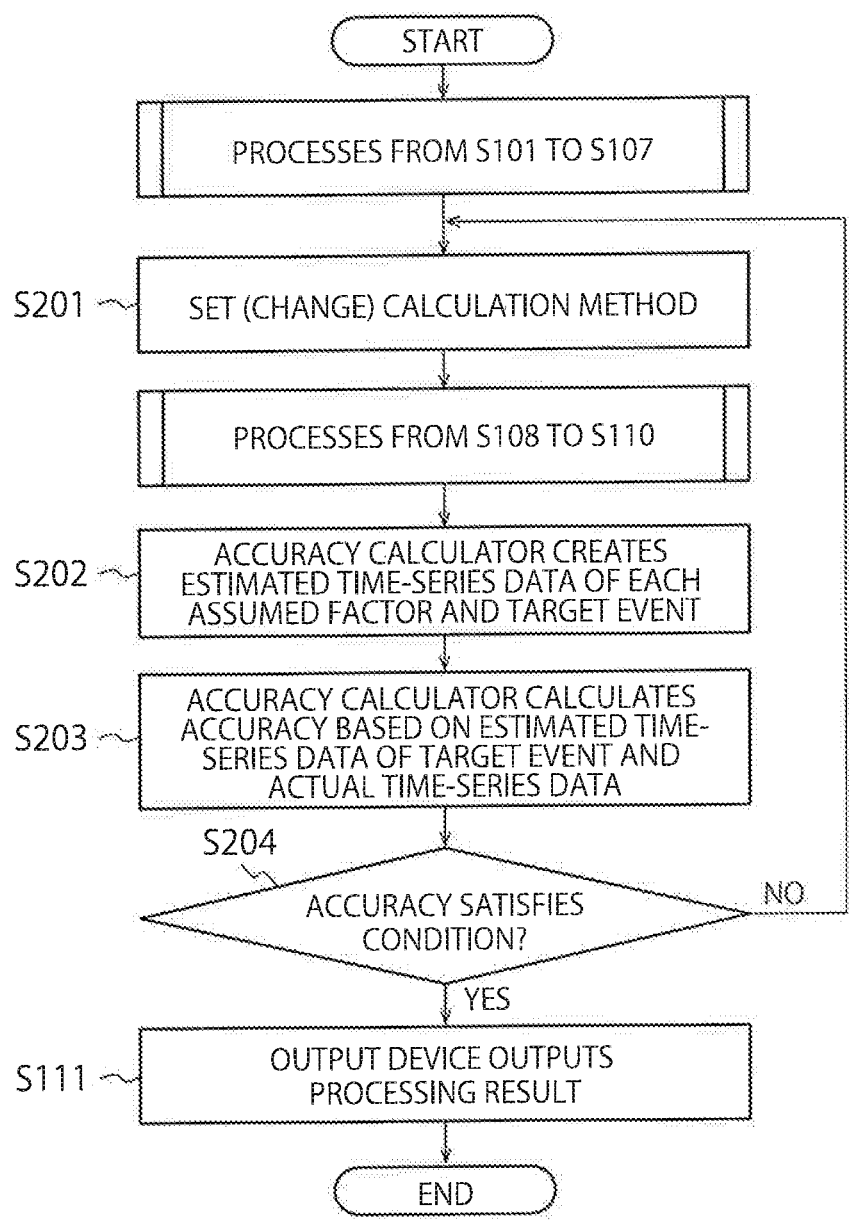
FIG. 11 is a diagram illustrating an example of a schematic flowchart of entire processing according to the second embodiment.

Next, a flow of processes by the components will be described. FIG. 11 is a diagram illustrating an example of a schematic flowchart of entire processing according to the second embodiment.

Processes from S101 to S107 are the same as those in the first embodiment. In the present embodiment, before processes in S108 and S109 are started, a calculation method to be used in current processing is set from among a plurality of calculation methods (S201). The calculation method may be any calculation method among calculation methods for the degree of similarity, the degree of influence of a sub-factor candidate on the target event, and the degree of influence of an assumed factor on the target event. The calculation method may be set by the setter 103, or by a component that uses the calculation method.

Next, processes from S108 to S110 are performed in the same manner as in the first embodiment. Furthermore, the accuracy calculator 109 creates the estimated time-series data of each assumed factor, and then creates the estimated time-series data of the target event (S202). Moreover, the accuracy calculator 109 calculates the accuracy on the basis of the estimated time-series data of the target event and actual time-series data of the target event (S203).

In the case where the accuracy does not satisfy a predetermined condition (S204: NO), the process in S201 is performed again, and the calculation method is changed. The degree of influence or the like is thereby calculated by a calculation method different from the previous method, and the accuracy is calculated again. The processing is repeated until the accuracy satisfies the condition. In the case where the accuracy satisfies the predetermined condition (S204: YES), the output device 108 outputs the processing result as in the first embodiment (S111), and the present flow is ended.

Figure 12:
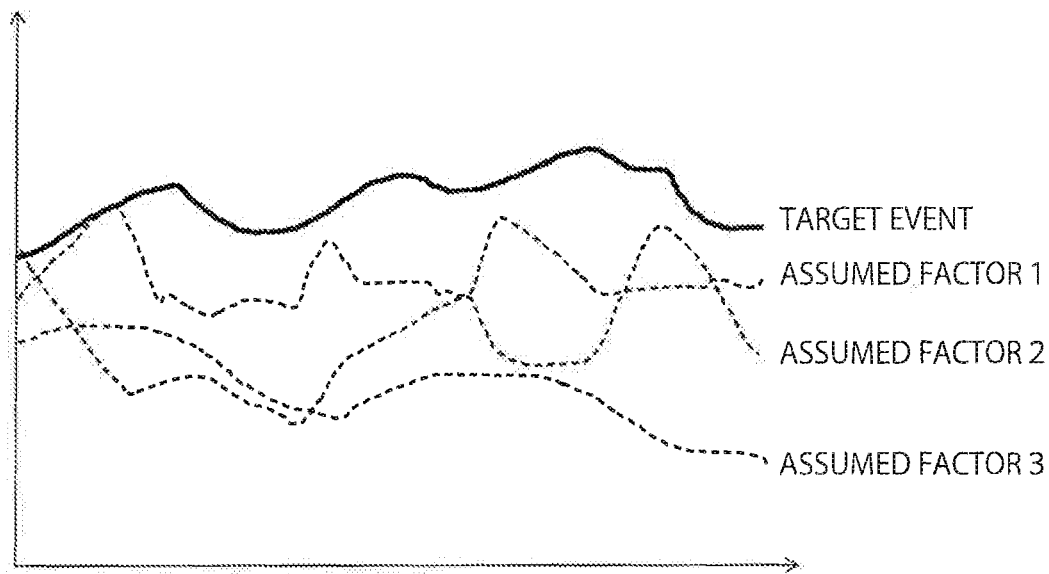
FIG. 12 is a diagram illustrating a third example of an output.

Incidentally, the output device 108 may output the correlation value, the accuracy, the estimated time-series data, and the like calculated by the accuracy calculator 109. FIG. 12 is a diagram illustrating a third example of an output. A solid line indicates the estimated time-series data of the target event. Dotted lines indicate the estimated time-series data of assumed factors. The actual time-series data of the target event is created by combining the dotted lines. The greater the correlation value between the solid line and the actual time-series data of the target event, the higher the accuracy in prediction of future transition of the target event.

As described above, according to the present embodiment, the accuracy calculator 109 calculates the accuracy of the degree of influence and the like. The reliability of an analysis result may thereby be checked. Furthermore, by switching the calculation method based on the accuracy, factor analysis may be stably performed with high accuracy.

Each process in the embodiments described above can be implemented by software (program). Thus, the embodiments described above can be implemented using, for example, a general-purpose computer apparatus as basic hardware and causing a processor mounted in the computer apparatus to execute the program.

Figure 13:
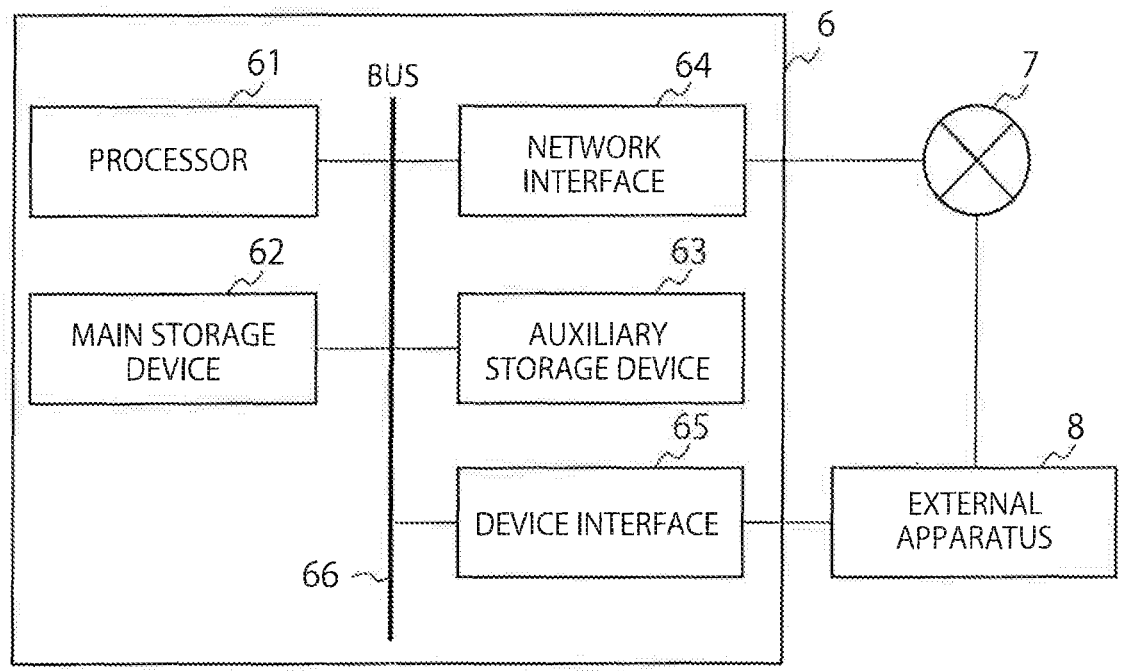
FIG. 13 is a block diagram illustrating an example of a hardware configuration according to an embodiment of the present invention.

FIG. 13 is a block diagram illustrating an example of a hardware configuration according to an embodiment of the present invention. The factor analysis apparatus 1 may be realized as a computer apparatus 6 including a processor 61, a main storage device 62, an auxiliary storage device 63, a network interface 64, and a device interface 65, where these elements are interconnected by a bus 66. The factor analysis apparatus 1 may further include an input device, and an output device.

The factor analysis apparatus 1 according to the present embodiment may be realized by installing a program to be executed by each device in the computer apparatus 6 in advance, or may be realized by installing, in the computer apparatus 6 as appropriate, programs stored in a storage medium such as a CD-ROM, or programs distributed over a network.

Incidentally, in FIG. 13, the computer apparatus includes one each of the components, but a plurality of the same components may alternatively be included. Moreover, FIG. 13 illustrates one computer apparatus, but software may be installed in a plurality of computer apparatuses. The plurality of computer apparatuses may perform different partial processes of the software to create a processing result. That is, the factor analysis apparatus 1 may be configured as a system.

The processor 61 is an electronic circuit including a control device and an arithmetic device of the computer. The processor 61 performs arithmetic processing based on data input from each device or the like in an internal configuration of the computer apparatus 6 or based on a program, and outputs an arithmetic result or a control signal to each device or the like. Specifically, the processor 61 executes the operating system (OS) of the computer apparatus 6, an application or the like, and controls each device constituting the computer apparatus 6.

The processor 61 is not particularly limited as long as the processing described above can be performed. For example, the processor 61 may be a general purpose processor, a central processing unit (CPU), a microprocessor, a digital signal processor (DSP), a controller, a microcontroller, or a state machine. Furthermore, the processor 61 may be embedded in an application specific integrated circuit, a field-programmable gate array (FPGA), or a programmable Logic device (PLD). Furthermore, the processor 61 may be configured from a plurality of processing devices. For example, a combination of a DSP and a microprocessor may be used, or one or more microprocessors that cooperate with a DSP core may be used.

The main storage device 62 is a storage device for storing commands to be executed by the processor 61, various pieces of data, and the like, and information stored in the main storage device 62 is directly read out by the processor 61. The auxiliary storage device 63 is a storage device different from the main storage device 62. Incidentally, a storage device is any electronic component which is capable of storing electronic information. As the main storage device 62, a volatile memory, such as a RAM, a DRAM or an SRAM, which is used to save temporary information is mainly used, but the main storage device 62 according to the embodiment of the present invention is not limited to these volatile memories. Storage devices used as the main storage device 62 and the auxiliary storage device 63 may be volatile memories or non-volatile memories. A non-volatile memory may be a programmable read-only memory (PROM), an erasable programmable read-only memory (EPROM), an electrically erasable PROM (EEPROM), a non-volatile random access memory (NVRAM), a flash memory, an MRAM, or the like. Furthermore, as the auxiliary storage device 63, a magnetic or optical data storage may be used. As the data storage, a magnetic disk such as a hard disk, an optical disk such as a DVD, a flash memory such as a USB, a magnetic tape, or the like may be used.

Incidentally, if the processor 61 directly or indirectly reads and/or writes information from the main storage device 62 or the auxiliary storage device 63, the storage device can be said to electrically communicate with the processor. Incidentally, the main storage device 62 may be integrated in the processor. Also in this case, the main storage device 62 can be said to electrically communicate with the processor.

The network interface 64 is an interface to be connected to a communication network 7 in a wireless or wired manner. As the network interface 64, an interface conforming to existing communication standards may be used. An output result or the like may be transmitted from the network interface 64 to an external apparatus 8 which is communicably connected via the communication network 7.

The device interface 65 is an interface, such as a USB, to be connected to the external apparatus 8 which records output results and the like. The external apparatus 8 may be an external storage medium, or a storage such as a database. An external storage medium may be any recording medium such as an HDD, a CD-R, a CD-RW, a DVD-RAM, a DVD-R, or a storage area network (SAN). Alternatively, the external apparatus 8 may be an output device. For example, a display apparatus for displaying an image, or an apparatus for outputting audio or the like may be used. For example, a liquid crystal display (LCD), a cathode ray tube (CRT), a plasma display panel (PDP), or a speaker may be used, but these are not restrictive.

Furthermore, a part or all of the computer apparatus 6, that is, a part or all of the factor analysis apparatus 1, may be configured by a dedicated electronic circuit (i.e., hardware), such as a semiconductor integrated circuit, on which the processor 61 and the like are mounted. Dedicated hardware may be combined with a storage device such as a RAM or a ROM.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A factor analysis apparatus that analyzes a relationship between a target event that is a target of factor analysis and an assumed factor that is assumed to be a factor of the target event, the factor analysis apparatus comprising:
   a memory storing a feature of a term and a program; and
   a processor configured to execute the program from the memory,
   an interface connected to a communication network or a device for transmitting information regarding an execution result by the processor,
   wherein the program configures the processor to, at least:
      receive a user request to analyze the relationship between the target event and the assumed factor;
      calculate a first feature of a name of a data item included in provided time-series data;
      extract a term that is similar to the data item from the memory on the basis of the first feature;
      calculate a second feature of a name of the assumed factor;
      extract a term that is similar to the assumed factor from a storage on the basis of the second feature;
      calculate, on the basis of a first term group extracted based on the first feature and a second term group extracted based on the second feature, a degree of name similarity between names of the data item included in provided time-series data and the assumed factor;
      calculate a first degree of influence indicating a degree of influence of the data item on the target event on the basis of time-series data of the data item and time-series data of the target event;
      calculate a second degree of influence indicating a degree of influence of the assumed factor on the target event on the basis of the degree of name similarity and the first degree of influence; and
      output, via the interface, an image comprising the target event and the assumed factor, wherein a displayed size of the assumed factor is adjusted to correspond to a magnitude of the second degree of influence.

2. The factor analysis apparatus according to claim 1, wherein, in a case where the assumed factor is present in plurality, a degree of name similarity to a first data item that is the data item is calculated for each of a plurality of assumed factors, and the second degree of influence of each of the plurality of assumed factors is calculated on the basis of at least the degree of name similarity to the first data item.

3. A factor analysis apparatus that analyzes a relationship between a target event that is a target of factor analysis and an assumed factor that is assumed to be a factor of the target event, the factor analysis apparatus comprising:
a memory storing a program configured to at least:
calculate a first feature of a name of a data item included in provided time-series data,
extract a term that is similar to the data item from the memory on the basis of the first feature,
calculate a second feature of a name of the assumed factor,
extract a term that is similar to the assumed factor from a storage on the basis of the second feature,
calculate, on the basis of a first term group extracted based on the first feature and a second term group extracted based on the second feature, a degree of name similarity between names of the data item included in the provided time-series data and the assumed factor,
calculate a first degree of influence indicating a degree of influence of the data item on the target event on the basis of time-series data of the data item and time-series data of the target event,
calculate a second degree of influence indicating a degree of influence of the assumed factor on the target event on the basis of the degree of name similarity and the first degree of influence,
calculate a correlation value between estimated time-series data of the target event and actual time-series data of the target event, and
output an image comprising the target event and the assumed factor, wherein a displayed size of the assumed factor is adjusted to correspond to a magnitude of the second degree of influence; and
a processor configured to execute the program from the memory.

4. The factor analysis apparatus according to claim 3, wherein a calculation method for at least the degree of name similarity or the first degree of influence is changed when the correlation value falls below a threshold for the correlation value.

5. The factor analysis apparatus according to claim 1, wherein the assumed factor is selected from a plurality of assumed factor candidates on the basis of the target event.

6. The factor analysis apparatus according to claim 1, wherein the program is further configured to:
acquire time-series data; and
output information about at least one of the target event, the assumed factor, the degree of name similarity, the first degree of influence, and the second degree of influence.

7. A factor analysis apparatus that analyzes a relationship between a target event that is a target of factor analysis and an assumed factor that is assumed to be a factor of the target event, the factor analysis apparatus comprising:
a memory storing a program configured to at least:
calculate a first feature of a name of a data item included in provided time-series data,
extract a term that is similar to the data item from the memory on the basis of the first feature,
calculate a second feature of a name of the assumed factor,
extract a term that is similar to the assumed factor from a storage on the basis of the second feature,
calculate, on the basis of a first term group extracted based on the first feature and a second term group extracted based on the second feature, a degree of name similarity between names of the data item included in the provided time-series data and the assumed factor,
calculate a first degree of influence indicating a degree of influence of the data item on the target event on the basis of time-series data of the data item and time-series data of the target event,
calculate a second degree of influence indicating a degree of influence of the assumed factor on the target event on the basis of the degree of name similarity and the first degree of influence,
acquire time-series data,
output an image comprising the target event and the assumed factor, wherein a displayed size of the assumed factor is adjusted to correspond to a magnitude of the second degree of influence; and
a processor configured to execute the program from the memory.

8. A factor analysis method for analyzing a relationship between a target event that is a target of factor analysis and an assumed factor that is assumed to be a factor of the target event, the factor analysis method comprising:
calculating a first feature of a name of a data item included in provided time-series data;
extracting a term that is similar to the data item from the memory on the basis of the first feature;
calculating a second feature of a name of the assumed factor;
extracting a term that is similar to the assumed factor from a storage on the basis of the second feature;
calculating, on the basis of a first term group extracted based on the first feature and a second term group extracted based on the second feature, a degree of similarity between the data item included in the provided time-series data and the assumed factor;
calculating a first degree of influence indicating a degree of influence of the data item on the target event on the basis of time-series data of the data item and time-series data of the target event;
calculating a second degree of influence indicating a degree of influence of the assumed factor on the target event on the basis of the degree of name similarity and the first degree of influence; and
outputting an image comprising the target event and the assumed factor, wherein a displayed size of the assumed factor is adjusted to correspond to a magnitude of the second degree of influence.

9. A non-transitory storage medium storing a program for analyzing a relationship between a target event that is a target of factor analysis and an assumed factor that is assumed to be a factor of the target event, the program being for causing a computer to perform:
calculating a first feature of a name of a data item included in provided time-series data;
extracting a term that is similar to the data item from the memory on the basis of the first feature;
calculating a second feature of a name of the assumed factor;
extracting a term that is similar to the assumed factor from a storage on the basis of the second feature;

calculating, on the basis of a first term group extracted based on the first feature and a second term group extracted based on the second feature, a degree of similarity between the data item included in the provided time-series data and the assumed factor;

calculating a first degree of influence indicating a degree of influence of the data item on the target event on the basis of time-series data of the data item and time-series data of the target event;

calculating a second degree of influence indicating a degree of influence of the assumed factor on the target event on the basis of the degree of name similarity and the first degree of influence; and outputting an image comprising the target event and the assumed factor, wherein a displayed size of the assumed factor is adjusted to correspond to a magnitude of the second degree of influence.

\* \* \* \* \*